Sept. 13, 1960  
N. GRUBELIC  
2,952,375  
DEVICE FOR MOISTENING ENVELOPE AND CUTTING AND  
APPLYING THE CUT STAMP TO THE ENVELOPE  
Filed March 6, 1957  
7 Sheets-Sheet 1

INVENTOR.  
NICHOLAS GRUBELIC  
BY  
J. B. Kelahan  
ATTORNEY

INVENTOR.
NICHOLAS GRUBELIC
BY
J. B. Felshin
ATTORNEY

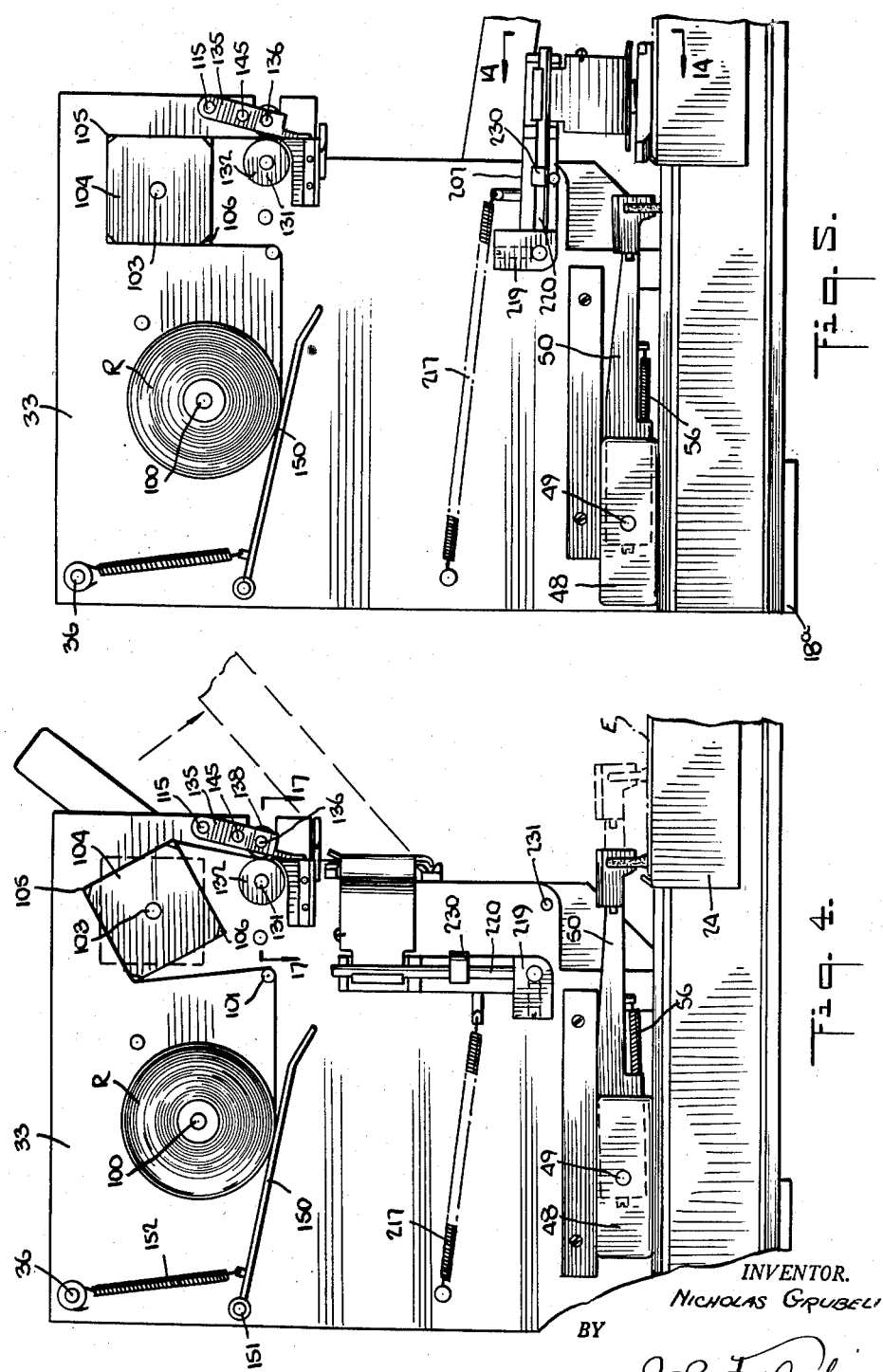

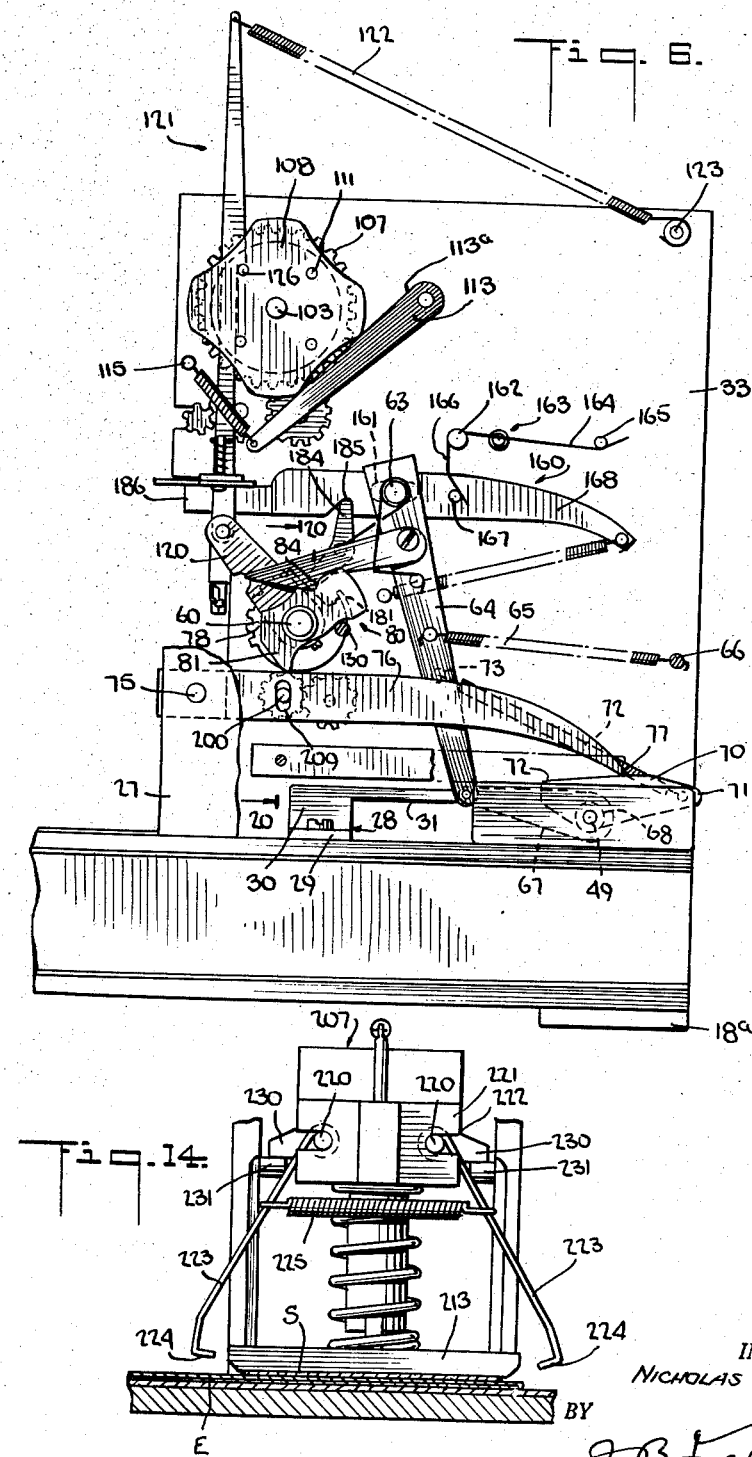

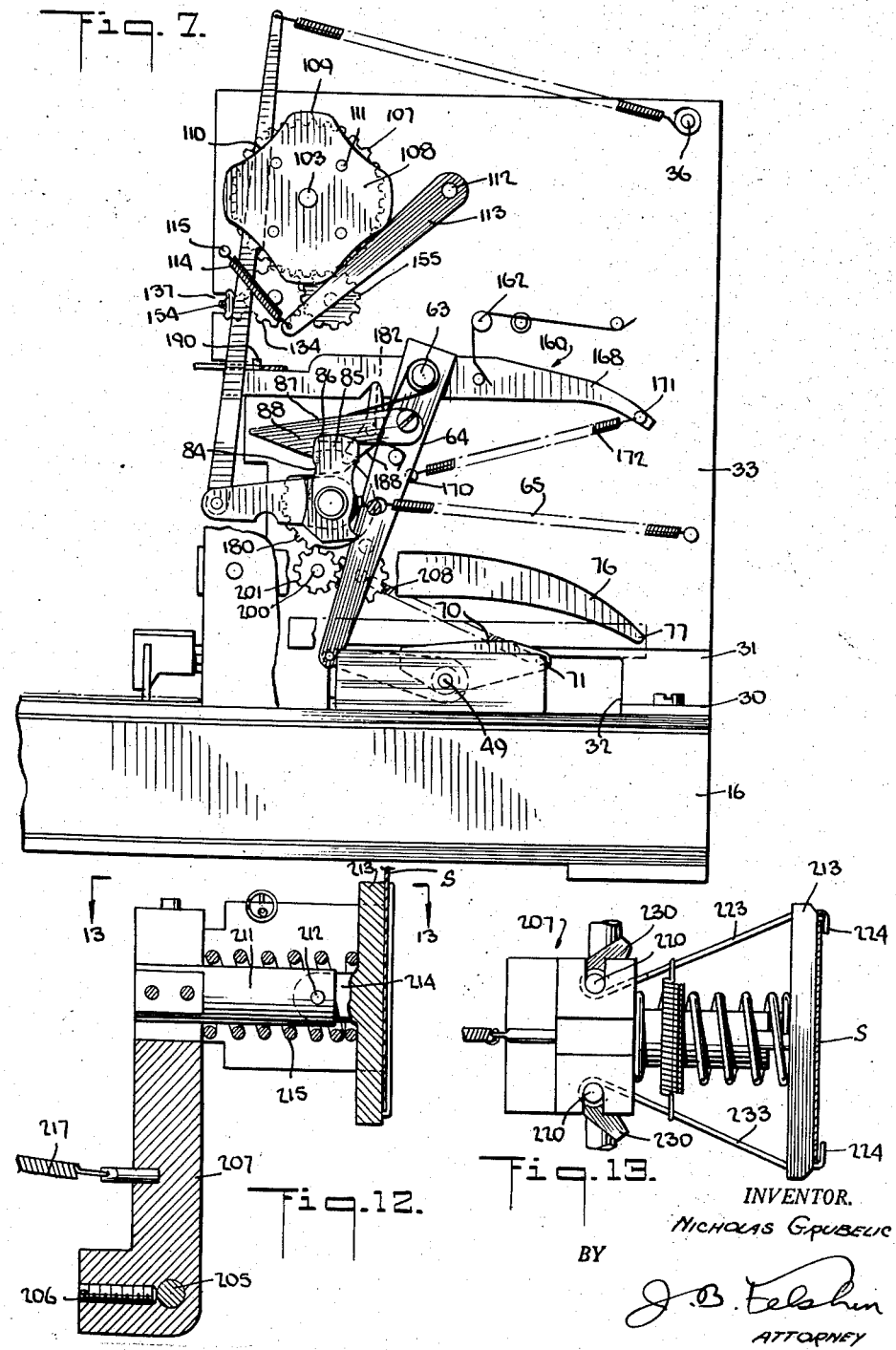

Sept. 13, 1960 N. GRUBELIC 2,952,375
DEVICE FOR MOISTENING ENVELOPE AND CUTTING AND
APPLYING THE CUT STAMP TO THE ENVELOPE
Filed March 6, 1957 7 Sheets-Sheet 6
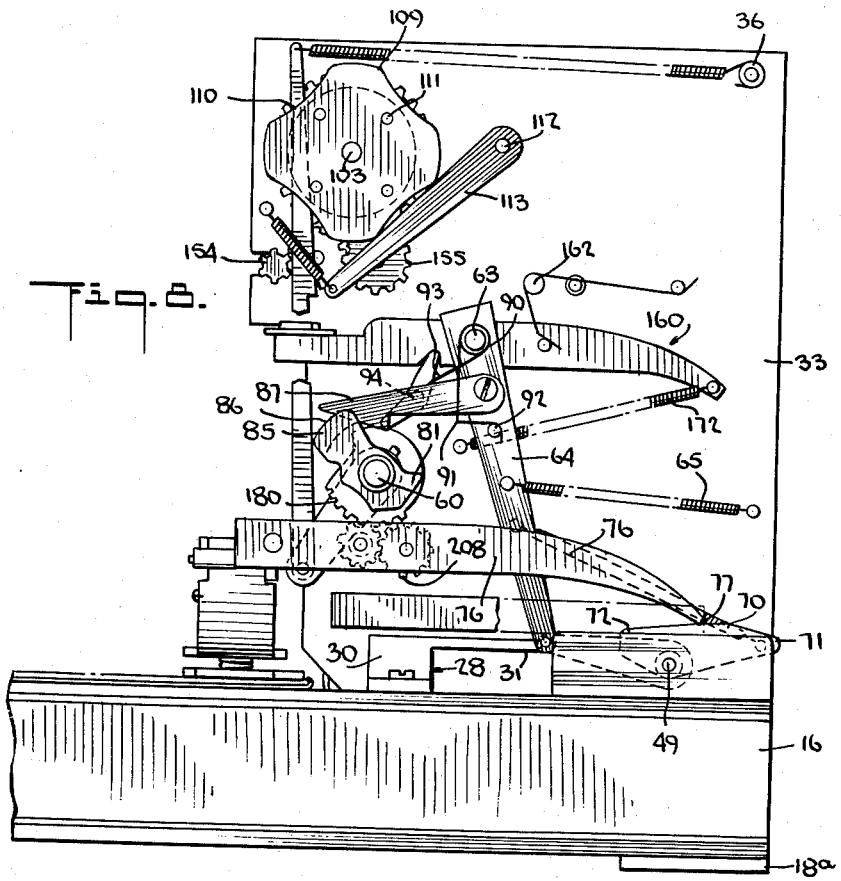
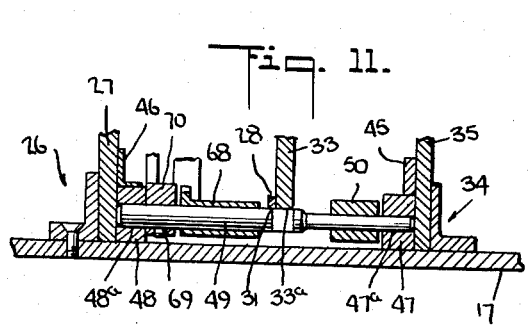
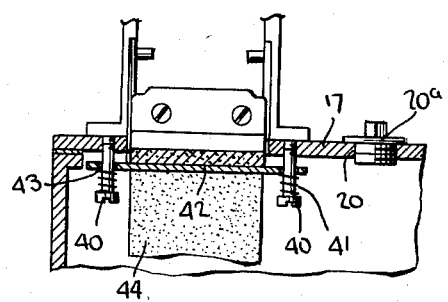
INVENTOR.
NICHOLAS GRUBELIC
BY
*J. B. Felshin*
ATTORNEY Sept. 13, 1960  N. GRUBELIC  2,952,375
DEVICE FOR MOISTENING ENVELOPE AND CUTTING AND
APPLYING THE CUT STAMP TO THE ENVELOPE
Filed March 6, 1957  7 Sheets-Sheet 7
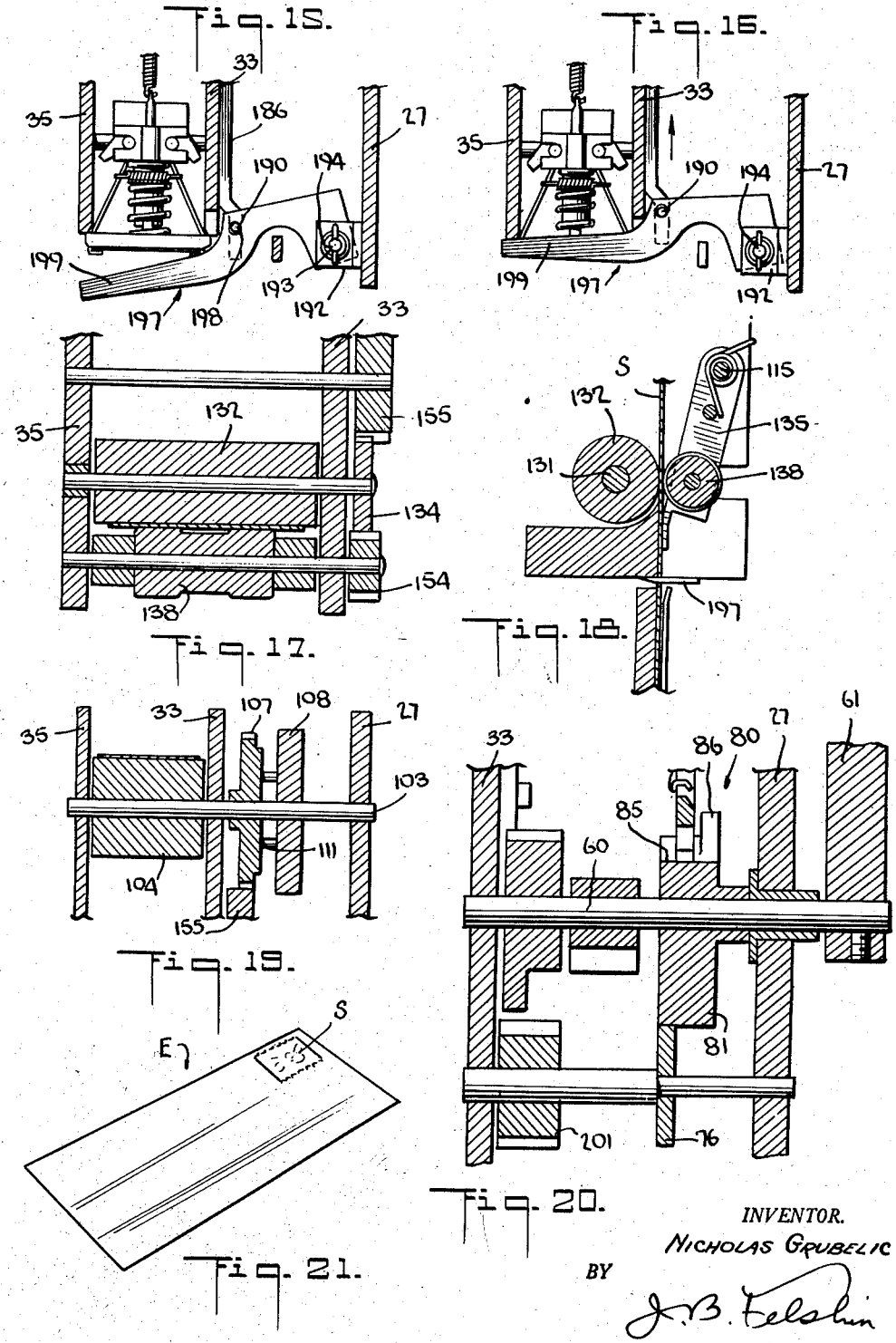
INVENTOR.
NICHOLAS GRUBELIC
BY
J.B. Felshin
ATTORNEY United States Patent Office 2,952,375
Patented Sept. 13, 1960

2,952,375
DEVICE FOR MOISTENING ENVELOPE AND CUTTING AND APPLYING THE CUT STAMP TO THE ENVELOPE

Nicholas Grubelic, Williston, N.Y., assignor to Pervi Auto Stamp Corp., Albertson, N.Y., a corporation of New York Filed Mar. 6, 1957, Ser. No. 644,274

15 Claims. (Cl. 216—29)

This invention relates to devices for moistening an envelope, cutting a stamp from a rolled strip of stamps, and applying the cut stamp to the moistened envelope.

An object of this invention is to provide a device of the character described, having means to support a rolled strip of stamps, means to cut one stamp off the strip, means for moistening an envelope, and means for applying the severed stamp onto the moistened envelope, all accomplished by a motion of a single manually actuated lever.

A further object of this invention is to provide in a device of the character described, means to restore all the parts to one initial position upon reversing the motion of the lever, so that upon the next forward motion of the lever another stamp will be cut from the strip, another envelope will be moistened, and the cut stamp will be applied to the moistened envelope.

A further object of this invention is to provide a device of the character described, having means to insure cutting of the stamps at the perforations, and means for advancing exactly one stamp at a time.

Still a further object of this invention is to provide in a device of the character described, means to advance the stamp strip, comprising rollers between which the strip is gripped, and means to separate the rollers to facilitate insertion or removal of the strip.

Yet a further object of this invention is to provide a device of the character described, having means to move a stamp from a position where it is cut from the strip downwardly with momentum against the moistened envelope, and to press the stamp against the envelope so that it will stick thereto.

Yet another object of this invention is to provide in a machine of the character described, a plate and a pair of pivoted levers having means to engage the edges of a stamp to hold the stamp against the plate, and means to rotate the levers for disengaging the stamp, when the stamp is applied to the envelope.

Yet another object of this invention is to provide in a machine of the character described, a reservoir for water formed with a slot, a wick within the reservoir to bring water to the slot, an arm pivoted on top of the reservoir and provided with a moistening pad projecting through said slot and engaging the wick for moistening the pad and means for raising the arm to bring the pad out of the slot and for then lowering the pad onto an envelope and wiping the pad back and forth across a portion of the envelope, for moistening the surface thereof where the stamp is to be applied.

Still a further object of this invention is to provide a strong, rugged and durable machine of the character described, which shall be relatively inexpensive to manufacture, which shall be sure and positive in operation, which shall be simple and easy to operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the appended claims.

In the drawings forming a part of this specification and accompanying the same;

Fig. 4 is a view similar to Fig. 2 but showing the pad holding arm in various advanced positions, and the stamp advancing means in various positions;

Fig. 5 is a view similar to Fig. 4 and showing the stamp applying means rotated fully downwardly to a position where the stamp is pressed against the envelope;

Fig. 6 is a cross-sectional view taken on line 6—6 of Fig. 1;

Fig. 7 is a view similar to Fig. 6 but showing the position of the parts with the operating lever partially swung wardly;

Fig. 8 is a view similar to Fig. 7 and showing the position of the pad when the lever is in its fully downwardly swung position;

Fig. 9 is a cross-sectional view taken on line 9—9 of Fig. 1;

Fig. 10 is a cross-sectional view taken on line 10—10 of Fig. 9;

Fig. 11 is a cross-sectional view taken on line 11—11 of Fig. 9;

Fig. 12 is a cross-sectional view taken on line 12—12 of Fig. 1;

Fig. 13 is a cross-sectional view taken on line 13—13 of Fig. 12;

Fig. 14 is a cross-sectional view taken on line 14—14 of Fig. 5;

Fig. 15 is a cross-sectional view taken on line 15—15 of Fig. 1 and illustrating the stamp cutting or severing mechanism;

Fig. 16 is a view similar to Fig. 15 but showing the cutting knife in position of cutting the stamp;

Fig. 17 is a cross-sectional view taken on line 17—17 of Fig. 4;

Fig. 18 is a cross-sectional view taken on line 18—18 of Fig. 1;

Fig. 19 is a cross-sectional view taken on line 19—19 of Fig. 2;

Fig. 20 is a cros-sectional view taken on line 20—20 of Fig. 6; and

Fig. 21 is a top perspective view of an envelope with severed stamp applied thereto.

Figure 1:
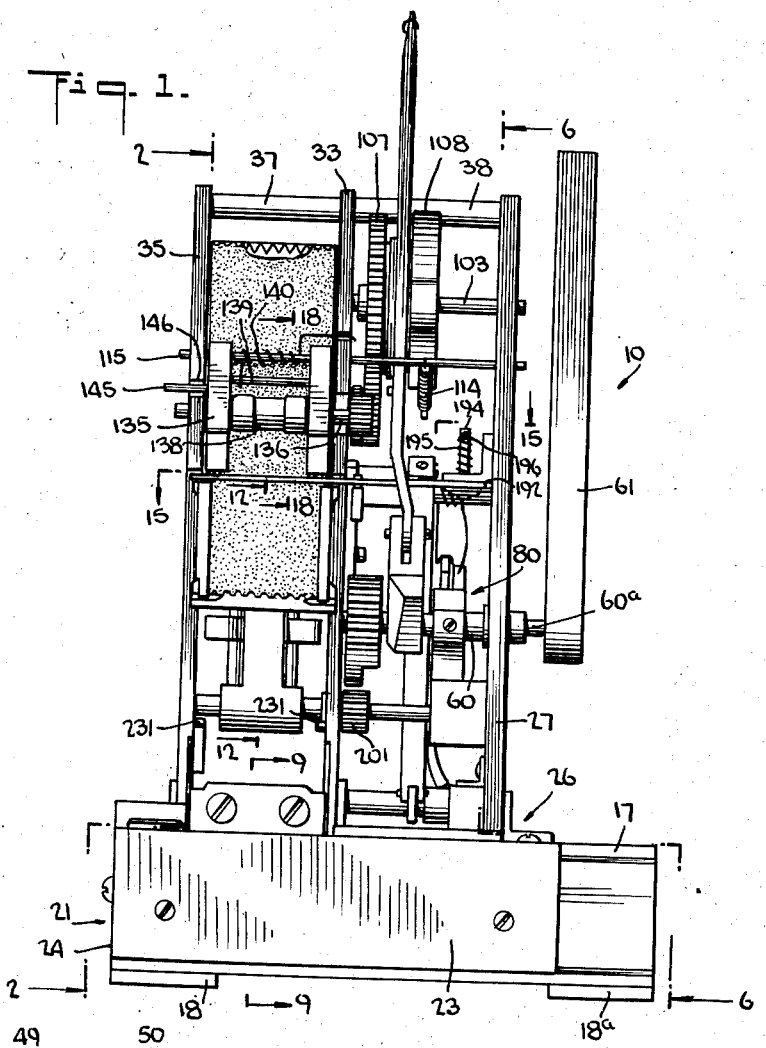
Fig. 1 is a front elevational view of the device embodying the invention in normal, at-rest position.

Referring now to the drawings, 10 designates a machine embodying the invention. The same comprises a water reservoir 11 which constitutes the base of the machine. Said base comprises a case 12 having a bottom wall 13, a front wall 14, a rear wall 15 and side walls 16. The front and rear walls may be formed with top inwardly extending flanges 14a and 15a respectively, on which is mounted a top plate 17 fixed to said flanges by screws 18, or other fastening devices. The base may be supported on corner pads 18a of any suitable construction. The top plate 17 is formed across the middle thereof with a transverse slot 19. Water may be inserted into the base either through the opening 19 or through a plugged opening 20 in said top wall (which may be closed by any suitable cap 20a).

A platform 21 may be mounted on one corner of the base, said platform comprising a top wall 22 overlying one corner of the top wall 17, a front wall 23 contacting the front wall 14 and a side wall 24 contacting one of the side walls 16. An envelope E to be stamped is placed on the top wall 22 prior to each operation of the machine. The top wall 22 is formed with upwardly and forwardly inclined aligned transverse lips 25 to catch the forward edge of the envelope for positioning the latter.

Fixed on the top wall 17 is an angle member 26 extending from front to rear, and disposed on the rear half of the top wall. Fixed to the vertical portion of the angle member 26 is vertical front plate 27 parallel to the side walls of the base. Wall 27 is spaced closer to one side wall than the other, and extends from the rear end of the top wall forwardly to a point somewhat more than half the length of the base. Also mounted on the top wall is an angle member 28 extending from front to rear and having a horizontal wall portion 29 and 30 and a vertical wall 31.

The vertical wall 31 is formed with a cut-out slot 32 (Fig. 7). Fixed to the vertical wall 31 is an upstanding frame plate 33 parallel to plate 27. Also fixed to the top wall 17 is an angle member 34 to the vertical wall of which is fixed a frame plate 35 parallel to walls 33 and 27. Said walls 27, 33 and 35 are interconnected by a tie rod 36 carrying a sleeve 37 between the plates 33 and 35 and a sleeve 38 between the plates 27 and 33.

The slot 19 in the top wall 17 is located between the walls 33 and 35. The lips 25 on top wall 22 of the platform are located forwardly of the slot 19 and on opposite sides of the slot.

Means is provided to bring water within the reservoir to the slot 19. To this end there is fixed to the top wall 17 a pair of headed screws 40 (Figs. 9 and 10), projecting downwardly into the reservoir. On the heads of the screws are springs 41 resiliently supporting a plate 42 formed with holes 43 through which the screws pass. Mounted between the plate 42 and the top wall 17 is a wick 44 the ends of which project downwardly into the water (Fig. 9).

Fixed to the inner side of plate 35, above the top wall 17, is a guide bar 45 (see Fig. 11). Fixed to the inner side of wall 27 is a guide angle bar 46. Slidably mounted on the top wall 17 against the inner side of plate 35 and between the top wall and guide bar 45 is a slide bar 47. Slidably mounted against the inner side of wall 27 and between the top wall 17 and guide member 46, is a slide block 48. In openings 47a and 48a of bar 47 and block 48 is a transverse horizontal shaft 49. Fixed to the shaft 49 is one end of a lever 50 (Fig. 9).

The forward end of the lever 50 is formed at its underside with a transverse slot 51 receiving an envelope moistening pad 52 projecting downwardly through the opening 19 into contact with the top of the wick 44. The rod 52 is moistened with water from the wick 54. The shaft 49 passes through slot 31 and angle member 28 and through a slot 33a at the lower end of plate 33 (see Fig. 11).

Means is provided to retract the blocks 47 and 48 and the shaft 49. To this end there is fixed to an intermediate portion of arm 50 a pin 55 anchoring one end of a coil tension spring 56, the rear end of which is anchored to a pin 57 fixed to plate 33 (see Fig. 9).

Figure 2:
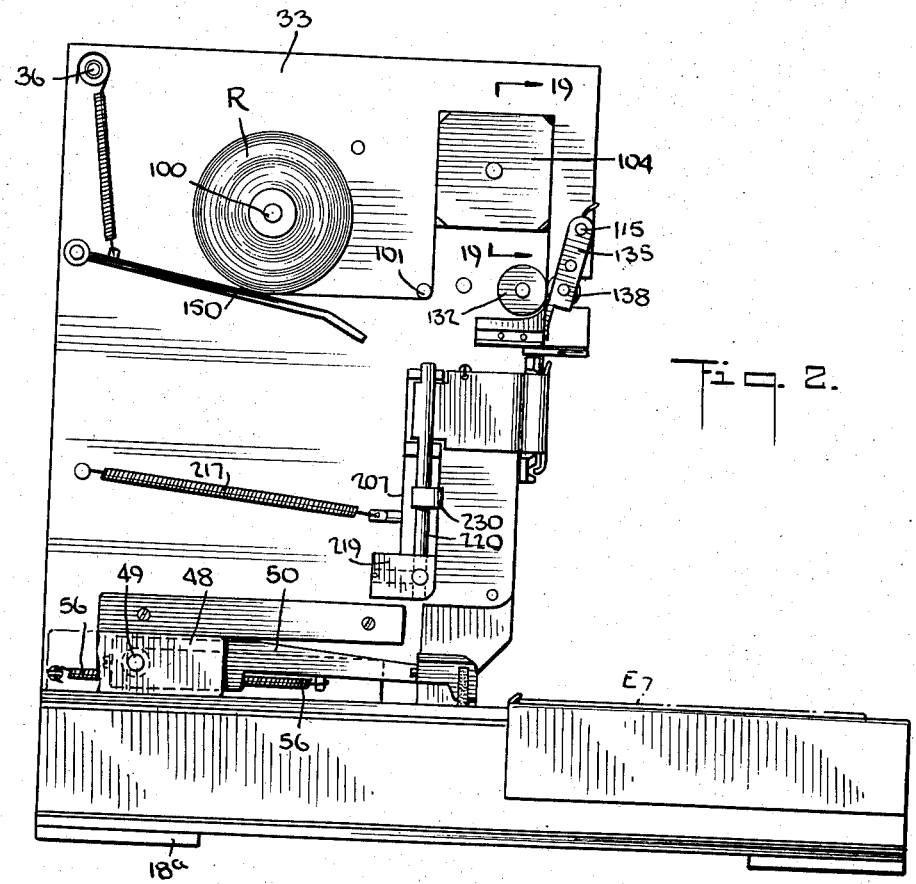
Fig. 2 is a cross-sectional view taken on line 2—2 of Fig. 1 and showing the moistener pad projecting into the water reservoir.
Figure 3:
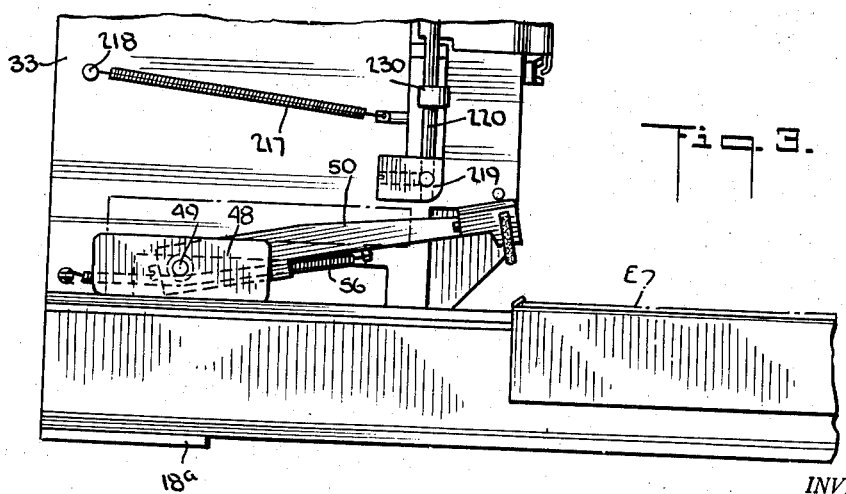
Fig. 3 is a partial view similar to Fig. 2 and showing the arm with the moistening pad tilted upwardly.

Mounted for rotation on and between the plates 33, 27 is a horizontal shaft 60 extending beyond plate 27 as at 60a. Fixed to the extending end 60a of shaft 60 is the main operating lever 61 which projects upwardly, normally. Means is provided for tilting the front end of the arm 50 upwardly from the position shown in Fig. 2, to the position shown in Fig. 3, for thereafter moving said arm forwardly, and then swinging it down from the position shown in Fig. 3 to the position shown in Fig. 4, so that the moistening pad 52 contacts the top of the envelope E in front of the lips 25 on the platform 22, and for thereafter slidably moving said arm 50 horizontal forwardly from the position shown in Fig. 4 to the position shown in Fig. 5, for moistening a portion of the envelope which is to receive the stamp, and for thereafter reversing the movement of the arm 50 back to the position of Fig. 2. (In the return movement, however, the arm does not tilt upwardly but just goes straight back until the pad 52 reaches the opening 19, and then the pad moves down into the opening into engagement with wick 44.)

To this end there is mounted on and between the plates 33 and 27 a fixed pivot pin 63 located about halfway up, and about halfway forwardly, about the rear edges of said plates. Pivoted to said pivot pin and extending downwardly therefrom is an arm 64 connected by a coil compression spring 65 to a fixed pin 66 adjacent the rear edge of plate 33. The spring 65 thus tends to rotate arm 64 in a counterclockwise direction, looking at Fig. 6. The lower end of arm 64 is connected by link 67 to the shaft 49. At the rear end of link 67 is a sleeve 68 journaled on the shaft 49 (Fig. 11).

Fixed on said shaft 49 as by set screw 69 is a rocker lever 70 having a rearwardly extending arm 71 and a forwardly extending arm 72 (Fig. 6). The top edge of the rocker 70 may be somewhat rounded. The rear end of arm 71 is connected by a coil tension spring 72 to arm 64 at a point 73 above the lower end thereof, but below the connection of spring 65 to said arm. The spring 72 thus tends to rock the rocker 70 and hence the moistening arm 50 in a counter-clockwise direction, looking at Fig. 6.

Pivoted to plate 27 adjacent the front edge thereof as at 75 is an arm 76 (Fig. 6) curved rearwardly and downwardly at its rear end, terminating in a point 77 engaging the rearwardly extending arm of the rocker 70 (rearwardly of the shaft 49). Fixed to the shaft 60 as by set screw 78 is an actuating cam member 80. Said member 80 has a cam portion 81 overlying the arm 76. When the main operating lever 61 is swung downwardly from its upward normal position, cam portion 81 will depress arm 76 thereby causing the rocker 70 to rock in a clockwise direction, looking at Fig. 6, for raising and moistening pad arm 50. Actuating member 80 is formed with a radial shoulder 84 from which extends a part circular surface 85. At one side of this part circular surface 85 is a guide flange 86 (see Fig. 7). Pivoted to arm 64 somewhat below the pivot pin 63 is a latch hook 87 resting in surface 85 and having a hook portion 88 engaging the shoulder 84 when the operating lever is in normal vertical position. Thus as the operating lever is swung forwardly the latch 87 engaging the shoulder 84 will pull the arm 64 forwardly to swing it in a clockwise direction from the position shown in Fig. 6 to the position shown in Fig. 7.

On the pivot pin 63 is a coil torsion spring 90. The torsion spring 90 has one arm 91 engaging a fixed pin 92 on arm 64. Said torsion spring has a second arm 93 engaging a pin 94 on the latch 87. The torsion spring 90 thus tends to press the latch 87 down against the actuating member 80. However, when the actuating member is rotated to position of Fig. 7, shoulder 84 will slip out from under the hook 88 thereby permitting the tension spring 65 to pull arm 64 back for swinging the latter in a counter-clockwise direction to the position shown in Fig. 8. It will be observed that as the operating lever is rotated downwardly and forwardly, cam portion 81 after depressing arm 76 to lift the moistening pad arm, will bypass said arm allowing the moistening arm to drop down. At the same time, however, arm 64 will have been swung forwardly to pull the shaft 49 forwardly, causing the moistening arm to slide forwardly as explained hereinafter and above. When the latch 87 is released, and arm 64 is swung rearwardly, arm 50 will also slide back to the position of Fig. 9.

Fixed to plate 33 is a shaft 100 supporting a roll R comprising a strip of stamps S. The roll of stamps is located between the plates 33 and 35. Interconnecting the plates 33 and 35 is a pin 101. A strip of stamps from the roll R engages beneath the pin 101 as illustrated in Figs. 4 and 5.

Journaled on and between the plates 27, 33 and 35 is a shaft 103. Fixed to the shaft and disposed between the plates 33 and 35 is a block 104 of square cross-section. Each corner of the block parallel to shaft 103 has spaced notches 105 forming prongs 106 adapted to engage within the perforations between adjacent stamps of the strip coming from roll R. The width of each face of the block is equal to the width of a stamp. Thus, in normal position, the rear, top and front of the block 104 are covered by stamps. Mounted on the shaft 103 and disposed adjacent plate 33 and between plates 33 and 27 is a gear 107. Also fixed to said shaft 103 in spaced relation to the gear 107 and disposed between the gear and plate 107 is a cam plate 108 having four equiangularly spaced rounded corners 109, and somewhat depressed surfaces 110 between said corners thereby forming four sides. The corners 109 are angularly aligned with the faces of the block 104. Fixed to said plate 108 and projecting toward the gear 107 are four equiangularly spaced ratchet pins 111, for the purpose hereinafter appearing.

Pivoted to plate 33 as on pin 112 is an arm 113 connected by a coil tension spring 114 to a pin 115 adjacent the front edge of said plate 33. The pin 115 extends through plates 27 and 35.

In the normal position illustrated in Fig. 6, arm 113 has an upper edge 113a disposed at 45 degrees to the vertical and contacts one side of plate 108 whereby to retain the faces of the block in horizontal and vertical positions. Fixed to member 80 is an upwardly inclined arm 120 which is pivoted to the lower end of an upwardly extending pawl member 121. The upper end of member 121 is connected by a coil tension spring 122 to a pin 123 fixed adjacent the upper rear corner of plate 33. Member 121 is formed with a hooking shoulder 126 adapted to engage one of the ratchet pins 111 when the operating lever is in its normally upwardly extended position. As the operating lever is swung downwardly, the hook or shoulder 126 will cause rotation of plate 108 and hence of shaft 103 and block 104, in a counter-clockwise direction, looking at Fig. 6. Such action will continue until the shoulder 126 slips off the pin 111 which it engages. At this time the block will have rotated substantially 90 degrees and arm 113 will snap against another side of plate 108. Thus each time the lever arm is swung downwardly the block 104 is rotated exactly 90 degrees. As the operating lever is moved upwardly, shaft 103 is not affected.

It will be noted that when the operating lever 61 is moved upwardly, the actuating cam member 80 is rotated in a clockwise direction until said cam contacts a fixed pin 130 fixed to the inner side of plate 27.

Journaled on and between the plates 33 and 35 is a shaft 131. Fixed on the shaft 131 and disposed between the plates 33 and 35 is a roller 132. The shaft 131 extends beyond plate 33 and fixed on the extending portion is a pinion 134. Pivotally mounted on the shaft 115 are a pair of downwardly extending arms 135 carrying at their lower ends a shaft 136. The shaft 136 passes through a notch 137 in the plate 33 (see Fig. 7) on the shaft 136 and between the arms 135, and fixed to said shaft is a roller 138. The arms 135 may be interconnected by pin 139. On that portion of the pin 115 between the arms 135 is a torsion spring 140 which tends to press the roller 138 against the roller 132. Fixed to one of the arms 135 is a pin 145 projecting through a notch 146 and plate 135. By engaging the pin 145 and pressing forwardly the roller 138 may be moved away from roller 132. The stamps from the strip may pass between the rollers which press against opposite surfaces of the stamps. It will be noted that the rollers 132, 138 are located just below the front face of the block 104. One stamp should project below the block before the machine begins to operate.

A plate 150 (Fig. 4) is pivoted at its rear end on pin 151 fixed to plate 133, and is held in contact with the underside of the roll R by a coil tension spring 152 which interconnects said plate with the fixed pin 36. The purpose of the plate 150 is to prevent loose rotation of the roll R.

Fixed on shaft 136 is a pinion 154 meshing with the pinion 134. Rotatably mounted on plate 33 is a pinion 155 which meshes both with gear 107 and with pinion 134.

It will now be understood that when the operating lever 61 is swung downwardly and forwardly, pinion 137 will be rotated in a counter-clockwise direction, looking at Fig. 7, thereby rotating pinion 155 in a clockwise direction, thereby rotating pinion 134 in a counter-clockwise direction, and pinion 154 in a clockwise direction. The rollers 132 and 138 will thereby be rotated in directions for feeding the stamp downwardly as the block 104 is rotated. Each time the operating lever moves down through a full operation, the width of one stamp is fed downwardly between the rollers.

Means is provided to cut off the end stamp of the strip at each forward operation of the lever 61. To this end there is slidably and pivotally mounted on the pin 63, a lever 160 located adjacent plate 33 and between said plate and plate 27. Lever 160 is formed with a horizontal slot 161 through which the shaft 63 passes. On plate 33 is a fixed pin 162 (Figs. 6, 7, 8). Mounted on said pin 162 is a torsion spring 163. The spring 163 has one arm 164 engaging the underside of a pin 165 fixed to plate 33. Said spring 163 has a second arm 166 engaging a pin 167 on the rearwardly extending arm 168 of lever 160, thereby tending to rock the lever 160 in a clockwise direction, looking at Fig. 6. Interconnecting a fixed pin 170 on plate 33 with a pin 171 on the rear end of arm 168 of lever 160 is a coil tension spring 172 which tends to slide the lever 160 forwardly.

Means is provided to slide the lever 160 rearwardly each time the operating lever 61 is swung downwardly. To this end there is fixed to the shaft 60 adjacent the plate 33 a segmental gear 180 formed with a shoulder 181. Pivoted to plate 33, as on pin 182, is a bell crank lever having an upwardly extending arm 184 projecting into a notch 185 in the underside of the forwardly extending arm 186 of lever 160. Said bell crank has a downwardly extending arm 188 adapted to be engaged by the shoulder 181 when the operating lever 61 is swung downwardly, thereby rotating the bell crank in a clockwise direction, and retracting the lever 160. Extending upwardly from the forward portion of arm 186 is a pin 190.

Fixed to the inner side of plate 27 (see Fig. 15) is a horizontal lug 192 formed with a through opening. Extending through an opening 193 in the said lug is a vertical pin 194 having a head at its lower side disposed below said lug. On the pin 194 is a coil compression spring 195 contacting the lug 192 at its lower end, and a cotter pin 196, at its upper end. Contacting the underside of the lug 192 is one end of a knife 197. The head of the pin 194 contacts the underside of the knife to press the knife underside against the underside of the lug 192. The knife 197 is formed with an opening 198 to receive the pin 190. Said knife has an inner cutting edge 199 and is disposed below the rollers 132, 138. The vertical distance between the cutting edge 199 and the lower surface of the block 104 is equal to the width of one stamp. It will now be understood that each time the operating lever 61 is swung downwardly and forwardly, lever 160 will be pulled back to rotate the knife 197 about the pivot pin 194 in a clockwise direction, looking at Fig. 15, moving the cutting edge 199 from the position shown in Fig. 15 to the position shown in Fig. 16, and thereby severing a stamp at the perforations. When the operating lever 61 is swung upwardly, the knife will swing forwardly from the position of Fig. 16 back to the position of Fig. 15 to permit another stamp to be fed downwardly. Such action of the knife is under the influence of the spring 172.

Means is provided to transfer a severed stamp from vertical position down onto the top of an envelope E placed on the platform 21 with its rear edge against the lips or flanges 25 and with the right hand edge of the envelope against the forward portion of the plate 27 or against any other suitable stop or shoulder of the base. To this end there is rotatably journaled on and between the plates 27 and 33 a shaft 200 located below the shaft 60. On shaft 200 is fixed a pinion 201 adapted to begin meshing with segmental gear 180 when the operating lever 61 has been pulled downward sufficiently to cut the stamp by means of the knife. Journaled on and between the plates 33 and 35 is a shaft 205 (Fig. 12). Fixed to said shaft as by a set screw 206, is an arm 207 normally projecting upwardly therefrom. The shaft 205 extends beyond plate 33 and fixed on the extending portion is a pinion 208 meshing with the pinion 201. It will be noted that the shaft 200 passes through arcuate slot 209 in arm 76 to permit said arm to rotate without interference from said shaft. Rotation of the operating lever 61 downwardly and forwardly will thus rotate the shaft 205 for swinging the arm 207 downwardly and forwardly as soon as the pinion 180 begins to mesh with the pinion 201.

Fixed to the upstanding arm 207 is a forwardly extending rod 211 carrying at its forward end a transverse pivot pin 212. Pivoted to the extending portions of the pin 212 is a plate 213. Said plate 213 has an apertured ear 214 receiving the pin 212 therethrough. Surrounding the rod 211 and interposed between the plate 213 and the arm 207 is a coil compression spring 215. Arm 207 is connected by a coil tension spring 217 to a fixed pin 218 on plate 33 for retaining said arm in upwardly extending position. The arm 207 is formed with a pair of parallel bearing openings 219 supporting a pair of parallel shafts 220. Said arm is formed with outwardly extending wings 221 provided with outwardly extending slots 222 receiving the shafts 220. Fixed to the shafts 220 at opposite sides of the plate 213 are stamp engaging wings 223 having inwardly bent edges 24 at their outer ends adapted to move inwardly into spaced parallel relation to the front face of the plate 213. The members 223 are interconnected by a coil tension spring 225.

It will now be understood that as the stamp S to be severed is moved downwardly against the front face of the plate 213, the outer ends of the stamp are engaged by the flanges or lips 224. After the stamp S is severed, arm 205 is swung downwardly due to engagement of the segmental gear 180 with the pinion 210 which in turn engages with the pinion 208. As the pin 207 is swung downwardly, the coil tension spring 217 is tensioned. The severed stamp held against the plate 213 by the lips 224 is then swung downwardly onto the top of the envelope which has already been moistened by the sweep of the moistening pad 52 forward and backward of a corner of the envelope.

In Fig. 5 there is shown the arm 207 in downwardly swung position. Means is provided to release the stamp S as the arm 207 is swung down. To this end there is fixed to the shafts 220 outwardly extending wings 230. There is also fixed to the inner sides of the plates 33 and 35, abutments 231 so positioned that as the stamp S approaches the envelope, the wings 230 are engaged by the abutments 231 and the stamp engaging members 223 are swung outwardly thereby releasing the stamp. As the operating lever 61 is pressed down, the plate 213 presses the stamp against the moistened envelope. The function of spring 215 is to permit a slight rotation of plate 213 about the pivot pin.

As the operating lever is swung upwardly, the wings 230 become disengaged from the abutments 231 permitting the spring 225 to swing the stamp engaging members 223 inwardly toward each other. However, arm 207 is moved upwardly at that time so that stamp S remains adhered to the envelope E. The spring 217 carries arm 207 to an upwardly extending position in which position the sides of the plate 213 contact the front edges of plates 33 and 35. The spring 225 also serves to retain the front ends of the shafts 220 within the notches 222.

Having thus described my invention, I claim as new and desire to secure by Letters Patent:

1. In combination, a reservoir for liquid provided with a top wall having a slot, an arm pivoted on said reservoir, a moistening pad on said arm projecting down through said slot into said reservoir, means to locate an envelope on the reservoir, means to raise said arm to bring the moistening pad out of the slot, then move the arm to bring the pad into wiping contact with a surface of an envelope located by said locating means on said reservoir, means to feed a strip of stamps a distance equal to the longitudinal dimension of one stamp of said strip, means for severing the said stamp, means to receive the fed stamp before it is severed, and means for transporting the fed and severed stamp onto the moistened surface of said envelope.

2. The combination of claim 1, in combination with means for moving the pivoted arm to bring the moistening pad back into said slot.

3. The combination of claim 1, in combination with means to bring liquid from the reservoir to said moistening pad.

4. The combination of claim 1, in combination with an operating lever, and means controlled by movement of said lever to control said pivoted arm, feeding means, severing means, and transporting means.

5. In combination, a block of square cross-section mounted for rotation about an axis thereof, whereby stamps from a strip may engage three faces of said block, an operating lever, means controlled by the movement of said lever to rotate said block 90 degrees, a pair of rollers engaging opposite sides of a stamp extending from said block, means controlled by said lever for rotating the rollers to feed the stamp as said block is being rotated, cutting means, means controlled by said lever for actuating the cutting means after the strip has been advanced a distance equivalent to the longitudinal dimension of one stamp, means to receive a stamp advanced beyond said cutting means, to hold the cut stamp, and means for moving the receiving means to transport the severed stamp onto an envelope.

6. The combination of claim 5, said receiving means including means to engage a pair of opposite edges of said stamps, and means controlled by the transporting movement of said receiving means to release the stamp from the stamp engaging means.

7. In combination, a water reservoir formed with a slot, a moistening pad holder, a pad held by said moistening pad holder and projecting through said slot, means to locate an envelope relative to the reservoir, means causing movement of said holder to lift the pad out of the slot and move it forward and back over a surface of the envelope, and to then return the pad to the slot, a block of square cross-section mounted on a horizontal axis, each face of the block adapted to have a stamp superimposed thereon, means to support a rolled strip of stamps so that the stamps are held against three faces of the block, with the block in such position that the front and rear faces are vertical and the top and bottom faces are horizontal, means to rotate said block through an angle of 90 degrees to feed the front end of the strip a distance equal to the longitudinal dimension of one stamp, means to receive the advanced stamp, means to cut the advanced stamp after the stamp has been advanced, said receiving means comprising a pair of pivoted wings having lips adapted to engage opposite edges of the received stamp, means for moving said receiving means downwardly after the cutting operation to press the received stamp onto the top of the moistened envelope, and means for swinging said pivoted wings away from each other to disengage said pressed stamp against said envelope, in combination with a pair of rollers engaging opposite sides of the stamp extending from the stamp which contacts the block, and means to rotate the rollers at the same time that the block is rotated whereby to feed the stamp strip to said receiving means.

8. In combination, a water reservoir, means to support a rolled strip of stamps, means to feed the strip from the roll a distance equivalent to a dimension of a stamp of said strip, means stationary while the strip is fed to receive the end stamp of said strip therein as said strip is fed, means to sever the received stamp from the strip, means to support an envelope to be stamped in stationary position, means movable from the reservoir and back thereto, to moisten a portion of said envelope while said envelope is in stationary position, and means to move the receiving means to apply the severed stamp onto the moistened portion of the envelope.

9. In combination, a means to support a rolled strip of stamps, means to feed the strip from the roll a distance equivalent to a dimension of a stamp of said strip, means to receive the end stamp of said strip as said strip is fed, means to sever the received stamp from the strip, means to support an envelope to be stamped, means to moisten a portion of said envelope and means to move the receiving means to apply the severed stamp onto the moistened portion of the envelope, said stamp receiving means including disengageable means to engage a pair of opposite edges of the received stamp, and means to disengage said opposite edges of the stamp upon applying the stamp to the moistened portion of the envelope.

10. The combination of claim 8, in combination with a manually movable member controlling the operation of said feeding means, receiving means, severing means and moistening means.

11. In combination, a support, a water tank, means to retain the water tank on said support in a predetermined position, means on the water tank to support an envelope to be stamped, said water tank having in its top wall an opening, a wick within the water tank extending to the opening, a wiper member projecting through said opening and contacting the wick, an operating handle mounted on said support, means to carry a rolled stamp strip on said support, means to feed the strip a distance equivalent to the longitudinal length of one stamp, means engaging opposed surfaces of the fed stamp to receive said stamp, means to sever the fed and received stamp in a severing position, means to cause the wiper to move from the opening in the water tank and to wipe said wiper across a surface of the envelope to moisten said surface of said envelope, means to transport the receiving means from the severing position to bring the stamp into contact with the moistened surface of the envelope, and means controlled by the operation of the operating handle to actuate the feeding means, the severing means, the transporting means and the wiper actuating means.

12. The combination of claim 11, said feeding means including roller means engaging the stamp strip, and means controlled by operation of said operating handle for rotating the roller means.

13. The combination of claim 12, said feeding means further including a block having faces each adapted to be engaged by a stamp, and means controlled by operation of said operating handle to rotate said block.

14. The combination of claim 11, in combination with means to return the wiper to the opening in the tank.

15. The combination of claim 11, said feeding means to engage the opposed edges of the stamp comprising flexible wings adapted to move away from each other to release the stamp.

References Cited in the file of this patent

UNITED STATES PATENTS

| | | |
|---|---|---|
| 993,732 | Storck | May 30, 1911 |
| 1,029,672 | Daniel et al. | June 18, 1912 |
| 1,211,499 | Storck | Jan. 9, 1917 |
| 1,293,959 | Smith | Feb. 11, 1919 |
| 1,407,026 | Greenough | Feb. 21, 1922 |
| 1,447,735 | Simone | Mar. 6, 1923 |
| 1,807,424 | Matzka | May 26, 1931 |
| 2,097,788 | Furrer | Nov. 2, 1937 |
| 2,279,994 | Jones | Apr. 14, 1942 |
| 2,636,729 | Smith | Apr. 28, 1953 |
| 2,660,428 | Davidson et al. | Nov. 24, 1953 |
| 2,721,669 | Keely | Oct. 25, 1955 |
| 2,721,670 | Shenigo | Oct. 25, 1955 |
| 2,754,022 | Schneider | July 10, 1956 |

FOREIGN PATENTS

| | | |
|---|---|---|
| 57,273 | Austria | Jan. 10, 1913 |